(12) United States Patent
Nakano et al.

(10) Patent No.: US 7,846,047 B2
(45) Date of Patent: Dec. 7, 2010

(54) BICYCLE SPROCKET HAVING A THICKENED SPLINE

(75) Inventors: Takahiro Nakano, Sennan (JP); Kenji Kamada, Abeno-ku (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 850 days.

(21) Appl. No.: 10/711,326

(22) Filed: Sep. 10, 2004

(65) Prior Publication Data

US 2006/0058140 A1    Mar. 16, 2006

(51) Int. Cl.
*F16H 55/30* (2006.01)
(52) U.S. Cl. .................. 474/152; 474/160; 474/164
(58) Field of Classification Search ........... 474/152, 474/153, 160, 164
See application file for complete search history.

(56) References Cited

U.S. PATENT DOCUMENTS

| | | | |
|---|---|---|---|
| 3,168,836 A * | 2/1965 | Militana | 474/152 |
| 3,707,884 A | 1/1973 | Go | |
| 4,044,621 A | 8/1977 | McGregor, Sr. et al. | |
| 4,121,474 A | 10/1978 | Arregui Suinaga | |
| 4,324,323 A | 4/1982 | Campagnolo | |
| 5,480,357 A * | 1/1996 | Liang | 474/77 |
| 5,733,215 A * | 3/1998 | Hsu et al. | 474/160 |
| 5,782,712 A | 7/1998 | Campagnolo | |
| 5,860,882 A * | 1/1999 | Petrilli et al. | 474/158 |
| 5,935,034 A | 8/1999 | Campagnolo | |
| 5,947,265 A * | 9/1999 | Merten et al. | 198/834 |
| 5,957,802 A | 9/1999 | Yoo | |
| 5,980,406 A * | 11/1999 | Mott et al. | 474/84 |
| 6,428,437 B1 * | 8/2002 | Schlanger | 474/160 |
| 2001/0039224 A1 * | 11/2001 | Lim et al. | 474/160 |
| 2002/0002092 A1 * | 1/2002 | Reguzzi | 474/152 |
| 2002/0033635 A1 | 3/2002 | Meggiolan | |
| 2003/0171180 A1 * | 9/2003 | Shahana et al. | 474/152 |
| 2004/0142782 A1 * | 7/2004 | Kamada et al. | 474/160 |
| 2004/0142783 A1 * | 7/2004 | Kamada et al. | 474/160 |
| 2005/0009654 A1 * | 1/2005 | Kanehisa et al. | 474/152 |

FOREIGN PATENT DOCUMENTS

| | | |
|---|---|---|
| CH | 258168 | 11/1948 |
| DE | 3810974 A1 | 12/1988 |
| EP | 1439117 A2 | 7/2004 |
| FR | 974460 A | 2/1951 |
| GB | 2177628 A | 1/1987 |
| JP | 5-266737 A | 10/1993 |
| JP | 6-307520 A | 11/1994 |

OTHER PUBLICATIONS

European search report for EP 05018432.4, the European application that corresponds to this application, dated Nov. 29, 2007.

* cited by examiner

*Primary Examiner*—Bradley T King
*Assistant Examiner*—Thomas Irvin
(74) *Attorney, Agent, or Firm*—James A. Deland

(57) ABSTRACT

A sprocket comprises a sprocket body; a plurality of teeth extending radially outwardly from the sprocket body and dimensioned to engage a bicycle chain; and a spline extending radially inwardly from the sprocket body, wherein the spline includes a radially outer surface facing radially outwardly.

17 Claims, 8 Drawing Sheets

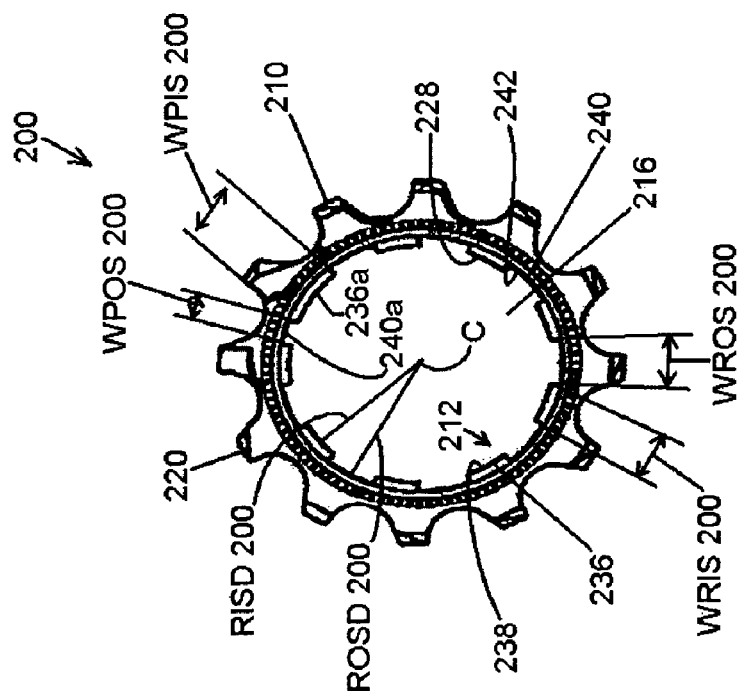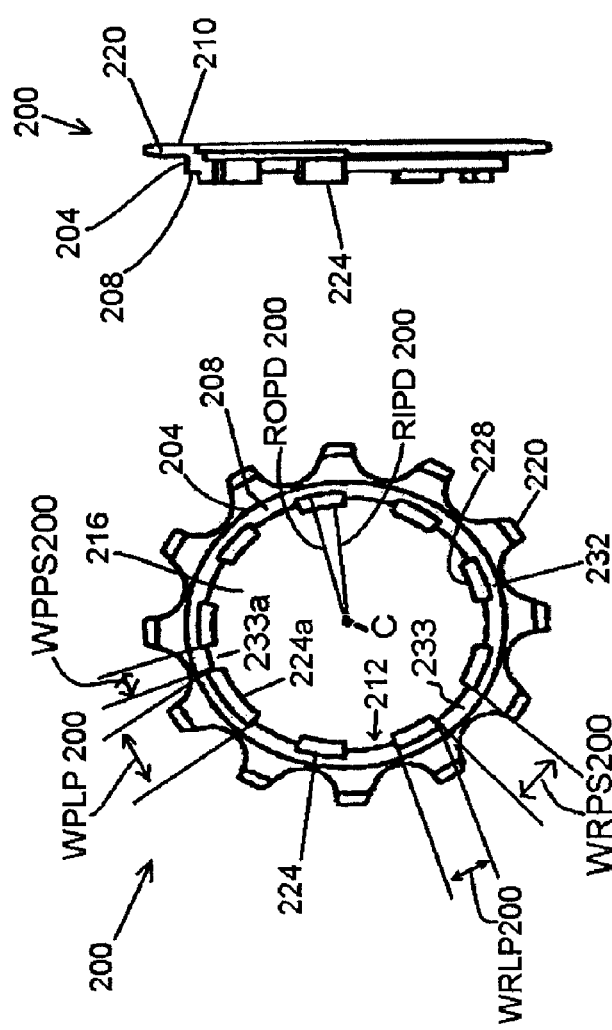
Fig. 3(A) Fig. 3(B) Fig. 3(C)

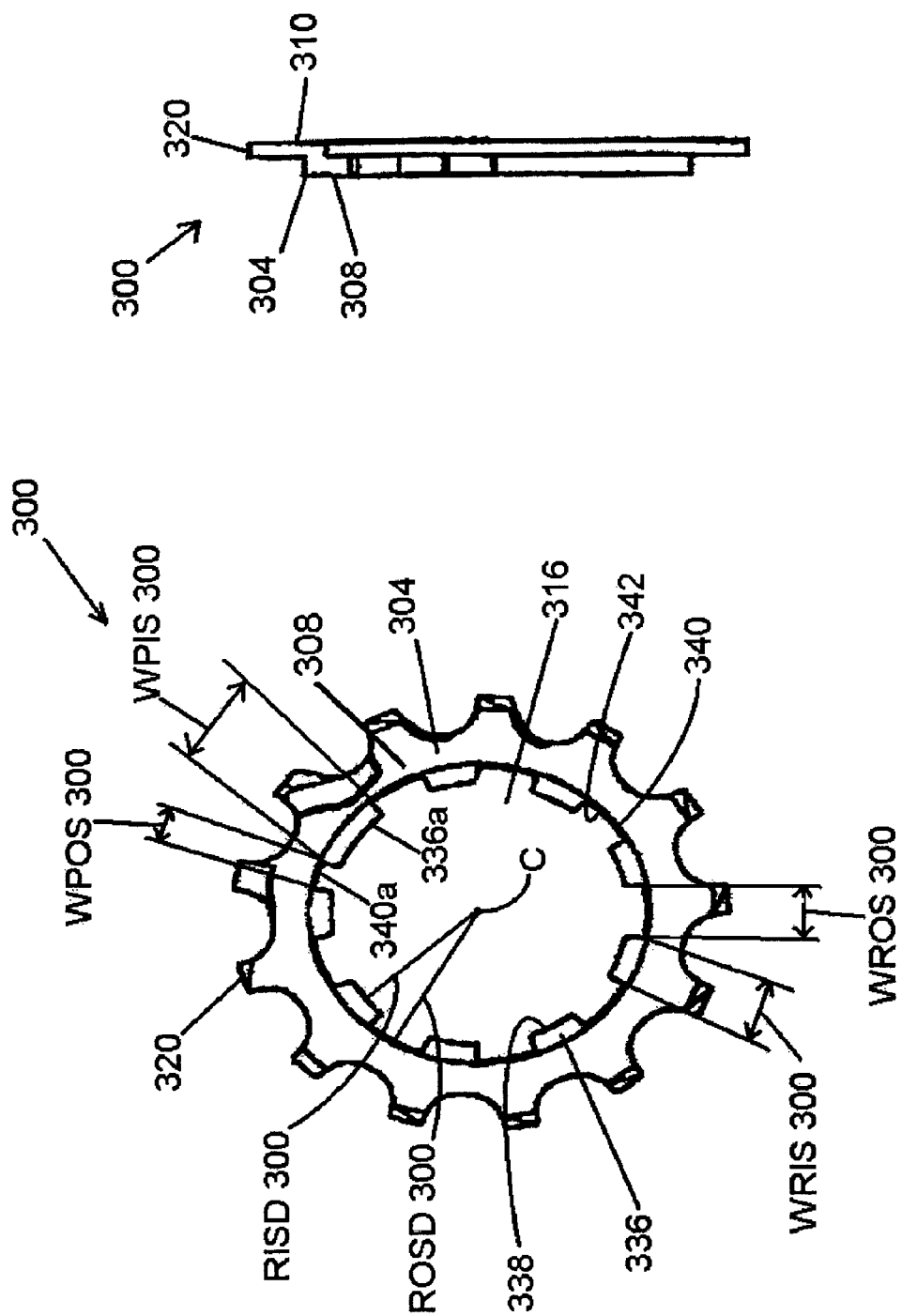

US 7,846,047 B2

BICYCLE SPROCKET HAVING A THICKENED SPLINE

BACKGROUND OF THE INVENTION

The present invention is directed to bicycles and, more particularly, to various features of a bicycle sprocket.

Bicycle transmissions usually comprise either internally mounted transmissions or externally mounted transmissions. Internally mounted transmissions usually have a planetary gear mechanism built into a rotating hub (e.g., one of the bicycle wheels), and a chain is used to drive a sprocket coupled to the planetary gear mechanism. A clutch mechanism is coupled to the planetary gear transmission to select a desired speed step, and the rider operates a shift control device to control the clutch mechanism. Externally mounted transmissions usually have a derailleur for switching a chain among a plurality of external sprockets, and the rider operates a shift control device to control the derailleur. Some applications combine the features of internally mounted transmissions and externally mounted transmissions by coupling a plurality of sprockets to the hub-mounted planetary gear mechanism and by using a derailleur to shift the chain among the plurality of sprockets. Such an arrangement multiplies the number of available speed steps. A shift control device operated by the rider is used to control the clutch mechanism and the derailleur. In any event, it is always desirable to mount the one or more sprockets in an advantageous manner.

SUMMARY OF THE INVENTION

The present invention is directed to various features of a bicycle sprocket. In one embodiment, the sprocket comprises a sprocket body; a plurality of teeth extending radially outwardly from the sprocket body and dimensioned to engage a bicycle chain; and a spline extending radially inwardly from the sprocket body, wherein the spline includes a radially outer surface facing radially outwardly.

Additional inventive features will become apparent from the description below, and such features alone or in combination with the above features may form the basis of further inventions as recited in the claims and their equivalents.

BRIEF DESCRIPTION OF THE DRAWINGS

FIG. 3(a) is a rear view of a particular embodiment of a twelve-tooth sprocket;

FIG. 3(b) is a partial cross-sectional side view of the sprocket shown in FIG. 3(a);

FIG. 3(c) is a front view of the sprocket shown in FIG. 3(a);

FIG. 4(a) is a front view of a particular embodiment of a thirteen-tooth sprocket;

FIG. 4(b) is a partial cross-sectional side view of the sprocket shown in FIG. 4(a);

DETAILED DESCRIPTION OF THE EMBODIMENTS

Figure 1:
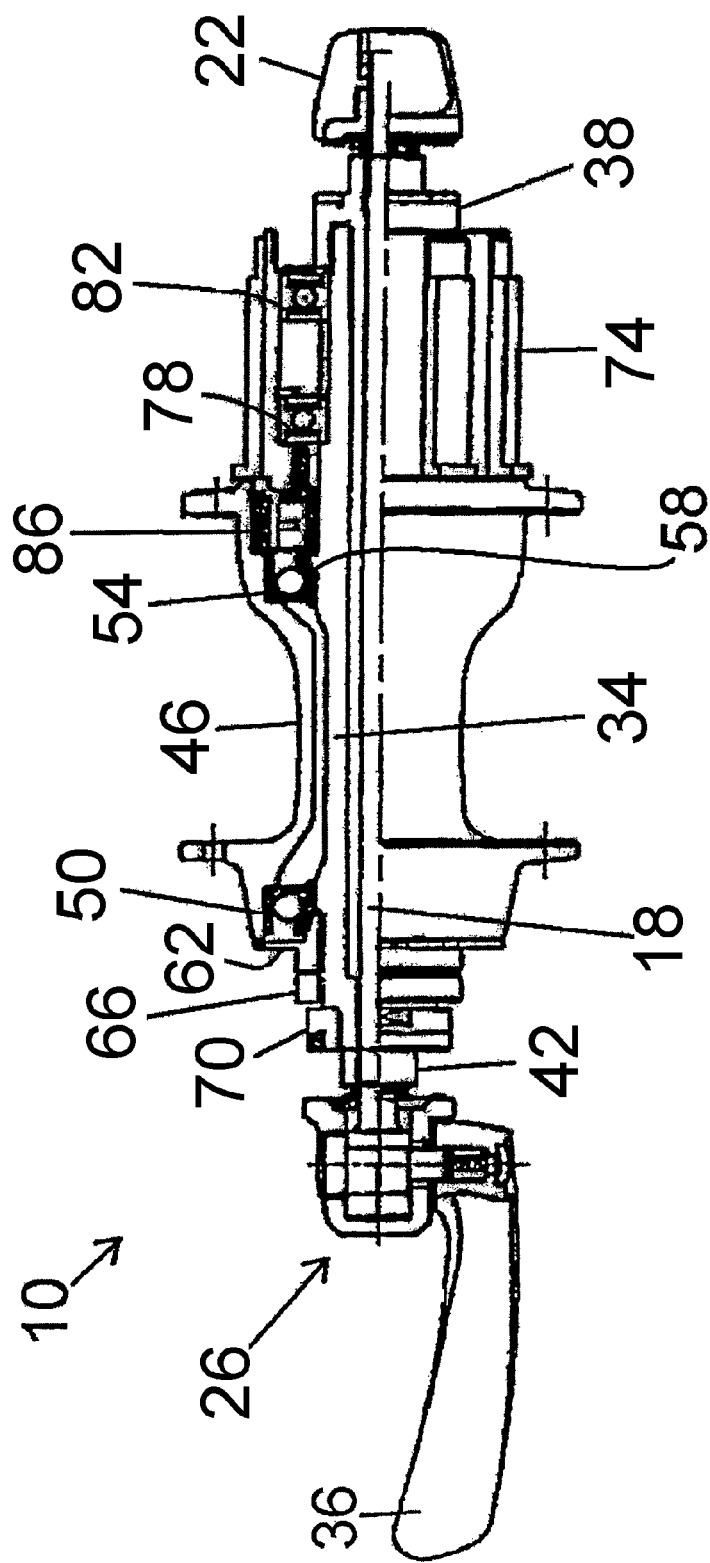
FIG. 1 is a partial cross-sectional view of a bicycle hub that employs a particular embodiment of a sprocket support.

FIG. 1 is a partial cross-sectional view of a bicycle hub 10 that may be mounted, for example, to a rear frame portion of a bicycle (not shown). Hub 10 includes an axle assembly comprising an axle 18, a fixing nut 22 that threadingly engages one end of axle 18, and a cam nut assembly 26 that engages the other end of axle 18 so that rotation of a cam lever 36 reduces the axial distance between fixing nut 22 and cam nut assembly 26 and thereby fixes hub 10 to the bicycle in a known manner. An axle shaft 34 surrounds axle 18. Axle shaft 34 is held on axle 18 by a retainer 38 and the end 42 of axle shaft 34 itself. A hub shell 46 is rotatably supported on axle shaft 34 by bearing assemblies 50 and 54, wherein bearing assembly 50 is axially fixed by a sloping surface 58 on axle shaft 34, and bearing assembly 54 is axially fixed by a retainer 62, a spacer 66 and a lock nut 70 disposed on axle shaft 34. A sprocket support 74 is rotatably supported on axle shaft 34 by bearing assemblies 78 and 82 and axially supported by retainer 38 in a known manner. Sprocket support 74 also is coupled to hub shell 46 through a one-way ratchet and pawl mechanism 86 in a known manner so that sprocket support 74 rotates relative to hub shell 46 in only one direction.

Figure 2A:
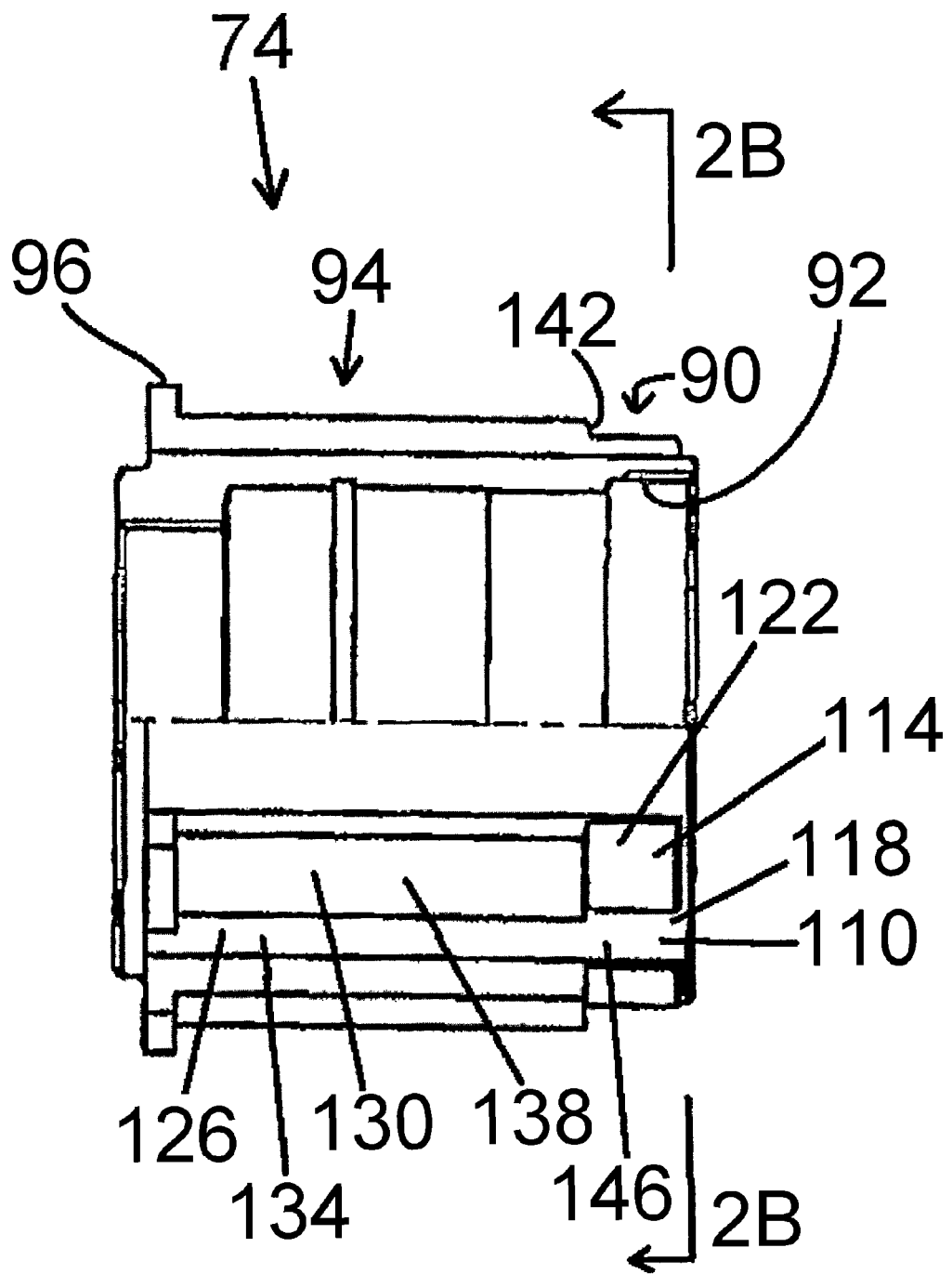
FIG. 2(a) is a partial cross-sectional view of a particular embodiment of the sprocket support.
Figure 2B:
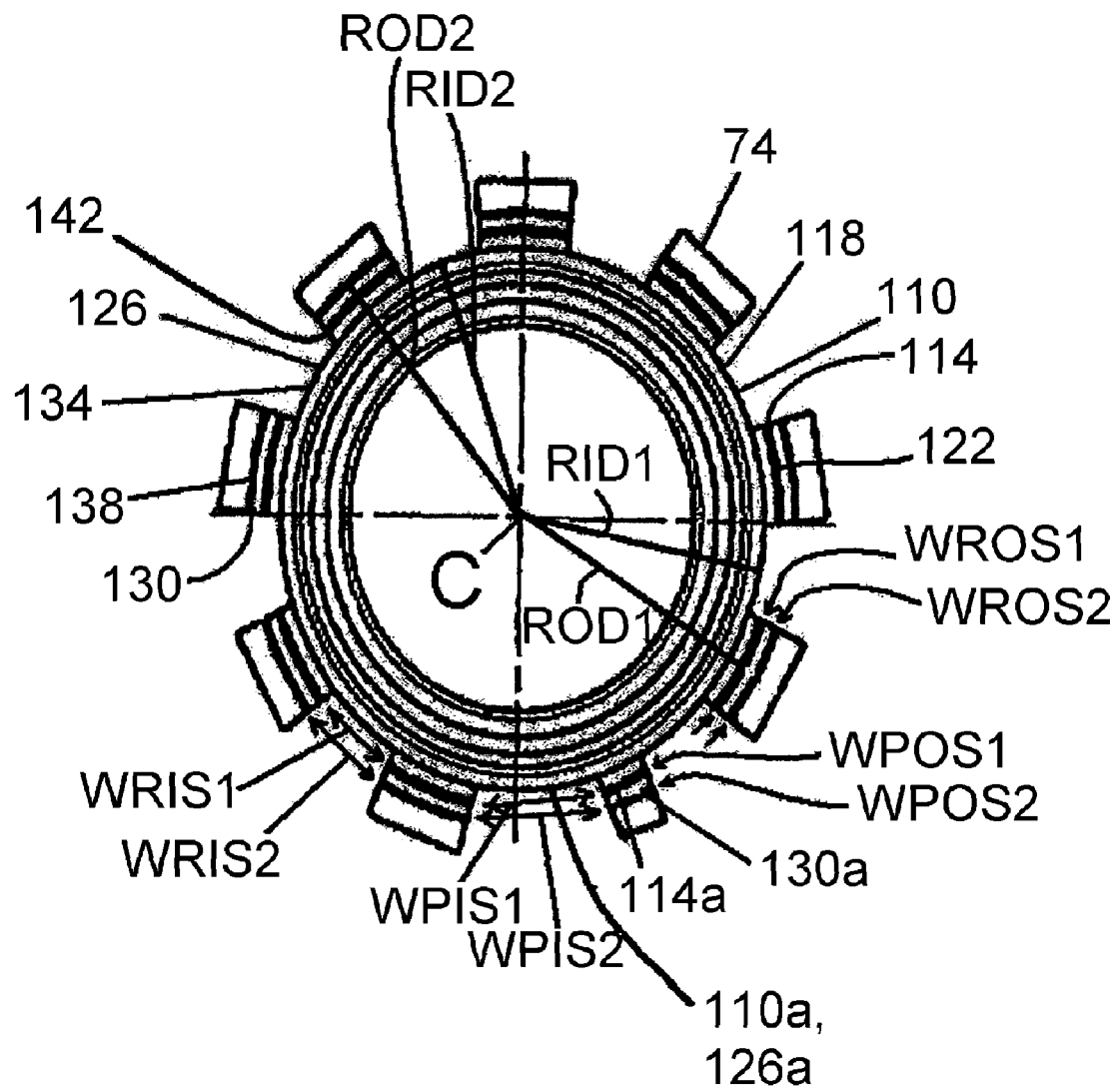
FIG. 2(b) is a view taken along line 2(b)-2(b) in FIG. 2(a)

FIG. 2(a) is a partial cross-sectional view of a particular embodiment of sprocket support 74, and FIG. 2(b) is a view taken along line 2b-2b in FIG. 2(a). As shown in those figures, sprocket support 74 comprises a first outer peripheral surface portion 90 with an internally threaded portion 92, a second outer peripheral surface portion 94, and a flange portion 96. First outer peripheral surface portion 90 is adapted to support an inner peripheral surface of a first sprocket (e.g., sprocket 200 shown in FIGS. 3(a)-3(c)) such that first outer peripheral surface portion 90 rotates around a rotational axis defined by axle 18, the axis and center of which is indicated by the reference letter C in FIG. 2(b). Similarly, second outer peripheral surface portion 94 is adapted to support an inner peripheral surface of a second sprocket (e.g., sprocket 300 shown in FIGS. 4(a)-4(c)) such that second outer peripheral surface portion 94 also rotates around the axis defined by axle 18.

First outer peripheral surface portion 90 defines a plurality of radially inwardly extending splines 110 and a plurality of radially outwardly extending splines 114, wherein each of the plurality of radially inwardly extending splines 110 has a radially inner surface 118 with a first radially inner distance RID1 from center C, and wherein each of the plurality of radially outwardly extending splines 114 has a radially outer surface 122 with a first radially outer distance ROD1 from center C. Similarly, second outer peripheral surface portion 94 defines a plurality of radially inwardly extending splines 126 and a plurality of radially outwardly extending splines 130, wherein each of the plurality of radially inwardly extending splines 126 has a radially inner surface 134 with a second radially inner distance RID2 from center C, and wherein each of the plurality of radially outwardly extending splines 130 has a radially outer surface 138 with a second radially outer distance ROD2 from center C. It should be clear from the drawings that the distance RID1 is substantially equal to the distance RID2, whereas the distance ROD1 is less than the distance ROD2. Furthermore, the distance ROD1 for each of the plurality of radially outwardly extending splines 114 is the same, and the distance ROD2 for each of the plurality of radially outwardly extending splines 130 is the same. Of course, such relationships are not necessary, and in other embodiments there may be any number of distances RID1 substantially equal to RID2, no distances RID1 substantially equal to RID2, any number of distances ROD1 less than the distances ROD2, no distance ROD1 less than ROD2, or any combination of distances that is desirable to suit the application.

A transition surface portion 142 extends radially between each of the radially outwardly extending splines 114 of the first outer peripheral surface portion 90 and its corresponding radially outwardly extending spline 130 of the second outer peripheral surface portion 94. In this embodiment, each transition surface portion 142 is perpendicular to both the radially outer surface 122 of its corresponding radially outwardly extending spline 114 and the radially outer surface 138 of its corresponding radially outwardly extending spline 130. Since there is no radially outwardly extending surface between the radially inwardly extending splines 110 of the first outer peripheral surface portion 90 and the radially inwardly extending splines 126 of the second outer peripheral surface portion 94 in this embodiment, a phantom transition surface portion 146 indicated by the phantom line in FIG. 2(a) may be assumed to exist at the same axial position as the transition surface portions 142 of each circumferentially adjacent pair of radially outwardly extending splines 114 and 130. Each phantom transition surface portion 146 can be considered a junction between a radially inwardly extending spline 110 of first outer peripheral surface portion 90 and its corresponding radially inwardly extending spline 126 of the second outer peripheral surface portion 94. Of course, in other embodiments the phantom transition surface portion 146 may have a visibly distinct axial width, in which case the junction between each radially inwardly extending spline 110 of first outer peripheral surface portion 90 and its corresponding radially inwardly extending spline 126 of the second outer peripheral surface portion 94 will be readily apparent.

In this embodiment, each radially outwardly extending spline 114 of first outer peripheral surface portion 90 at least partially overlaps a corresponding radially outwardly extending spline 130 of second outer peripheral surface portion 94 when viewed in a direction perpendicular to the transition surface portion 142 (i.e., the view shown in FIG. 2(b)). More specifically, each radially outwardly extending spline 114 completely overlaps its corresponding radially outwardly extending spline 130 in the circumferential direction when viewed in a direction perpendicular to the transition surface portion 142. Of course, such a relationship is not necessary, and the degree of overlap, if any, may change depending on the application. Furthermore, in this embodiment, the circumferential width WROS1 of each radially outwardly extending spline 114 is the same, and the circumferential width WROS2 of each radially outwardly extending spline 130 is the same. Also, the circumferential width WROS1 of each radially outwardly extending spline 114 is substantially equal to the circumferential width WROS2 of its corresponding radially outwardly extending spline 130. Thus, each radially outwardly extending spine 114 completely aligns with its corresponding radially outwardly extending spline 130 in the circumferential direction. Of course, such relationships are not necessary, and they may change depending upon the application. Such relationships between WROS1 and WROS2 also bring about corresponding relationships to the circumferential widths WRIS1 and WRIS2 of radially inwardly extending splines 110 and 126, respectively. This configuration of sprocket support 74 is shown in FIG. 2(b).

In this embodiment, at least one of the plurality of radially outwardly extending splines 114, such as spline114a, has a different circumferential width WPOS1 than another one of the plurality of radially outwardly extending splines 114, and at least one of the plurality of radially outwardly extending splines 130, such as spline 130a, has a different circumferential width WPOS2 than another one of the plurality of radially outwardly extending splines 130. Similarly, at least one of the plurality of radially inwardly extending splines 110, such as spline 110a, has a different circumferential width WPIS1 than another one of the plurality of radially inwardly extending splines 110, and at least one of the plurality of radially inwardly extending splines 126, such as spline 126a has a different circumferential width WPIS2 than another one of the plurality of radially inwardly extending splines 126. This allows the sprockets mounted on sprocket support 74 to be positioned at predetermined rotational positions in a manner described below.

FIG. 3(a) is a rear view of a particular embodiment of a twelve-tooth sprocket 200, FIG. 3(b) is a partial cross-sectional side view of sprocket 200, and FIG. 3(c) is a front view of sprocket 200. In this embodiment, sprocket 200 is adapted to be installed on one of the first outer peripheral surface portion 90 or second outer peripheral surface portion 94 of sprocket support 74. More specifically, sprocket 200 is adapted to be installed on first outer peripheral surface portion 90 of sprocket support 74. Sprocket 200 comprises a sprocket body 204 having side surface 208 and 210 and an inner peripheral surface 212. Inner peripheral surface 212 defines a sprocket mounting opening 216, wherein at least one portion of the inner peripheral surface 212 is adapted to contact sprocket support 74. In this embodiment, the entire inner peripheral surface 212 contacts the sprocket support 74. Sprocket 200 further comprises a plurality of sprocket teeth 220 extending radially outwardly from the sprocket body 204, wherein the lower portion of sprocket body 204 is axially offset (to the left in FIG. 3(b)) from the plurality of sprocket teeth 220.

At least one lateral projection or spline 224 extends laterally from the side surface 208 of the sprocket body 204 in close proximity to the at least one portion of the inner peripheral surface 212 that is adapted to contact the sprocket support 74. In this embodiment, there is a plurality of such projections 224 with a lateral projection space 233 between each adjacent pair of lateral projections. Each lateral projection 224 has a radially inner surface 228 and a radially outer surface 232. Inner peripheral surface 212 of sprocket 200 also defines at least one radially inwardly extending spline 236 and one radially outwardly extending spline 240. In this embodiment, there is a plurality of such radially inwardly extending splines 236 and radially outwardly extending splines 240. Each radially inwardly extending spline 236 has a radially inner surface 238, and each radially outwardly extending spline 240 has a radially outer surface 242. In this embodiment, there are nine lateral projections 224, radially inwardly extending splines 236 and radially outwardly extending splines 240, wherein each lateral projection 224 and radially inwardly extending spline 236 alternates with a corresponding radially outwardly extending spline 240. Each lateral projection 224 at least partially overlaps or aligns with a corresponding radially inwardly extending spline 236 when viewed in a direction perpendicular to side surface 208 (i.e., in the direction shown in FIG. 3(a)). In this embodiment, each lateral projection 224 completely overlaps and aligns with its corresponding radially inwardly extending spline 236, and each lateral projection space 233 aligns with its corresponding radially outwardly extending spline 240 when viewed in a direction perpendicular to side surface 208, but in other embodiments there may be only a partial overlap or alignment for some lateral projections 224 and radially inwardly extending splines 236, or no overlap or alignment at all for other lateral projections 224 and radially inwardly extending splines 236. In fact, the number of lateral projections 224 need not be the same as either the number of radially inwardly extending splines 236 or radially outwardly extending splines 240.

In general, a circumferential width WRLP200 of at least one lateral projection 224 is substantially the same as a circumferential width WRIS200 of at least one of the radially inwardly extending splines 236. In this embodiment, a circumferential width WRLP200 of each lateral projection 224 is substantially the same as the circumferential width WRIS200 of its corresponding radially inwardly extending spline 236. Furthermore, the circumferential widths WRLP200 of all of the lateral projections 224 are the same except for a circumferential width WPLP200 of a lateral positioning projection 224a, and the circumferential widths WRPS200 of all of the lateral projection spaces 233 are the same except for a circumferential width WPPS200 of a lateral projection space 233a. The circumferential widths WRIS200 of all of the radially inwardly extending splines 236 are the same except for a circumferential width WPIS200 of a radially inwardly extending positioning spline 236a, and the circumferential widths WROS200 of all of the radially outwardly extending splines 240 are the same except for a circumferential width WPOS200 of a radially outwardly extending positioning spline 240a.

In this embodiment, a distance RIPD200 of the radially inner surface 228 of at least one lateral projection 224 from the center C of the sprocket 200 is substantially the same as a distance RISD200 of the radially inner surface 238 of at least one radially inwardly extending spline 236 from the center C of the sprocket 200. More specifically, the distance RIPD200 of the radially inner surface 228 of each of the plurality lateral projections 224 from the center C of the sprocket 200 is substantially the same, and the distance RISD200 of the radially inner surface 238 of each of the plurality of radially inwardly extending splines 236 from the center C of the sprocket 200 is the same. Consequently, the distance RIPD200 of the radially inner surface 228 of each of the plurality of lateral projections 225 from the center C of sprocket 200 is substantially the same as the distance RISD200 of the inner surface 238 of each of the plurality of radially inwardly extending splines 236 from the center C of sprocket 200.

In this embodiment, a distance ROPD200 of the radially outer surface 232 of at least one lateral projection 224 from the center C of the sprocket 200 is greater than a distance ROSD200 of the radially outer surface 242 of at least one radially outwardly extending spline 240 from a center C of the sprocket 200. More specifically, the distance ROPD200 of the radially outer surface 232 of each of the plurality of lateral projections 224 from the center C of the sprocket 200 is substantially the same, and the distance ROSD200 of the radially outer surface 242 of each of the plurality of radially outwardly extending splines 240 from the center C of the sprocket 200 is substantially the same. Consequently, the distance ROPD200 of each radially outer surface 232 of the plurality of lateral projections 224 from the center C of sprocket 200 is greater than the distance ROSD200 of the outer surface 242 of each of the plurality of radially outwardly extending splines 240 from the center C of sprocket 200.

FIG. 4(a) is a front view of a particular embodiment of a thirteen-tooth sprocket 300, and FIG. 4(b) is a partial cross-sectional view of sprocket 300. In this embodiment, sprocket 300 is adapted to be installed on either one of the first outer peripheral surface portion 90 or second outer peripheral surface portion 94 of sprocket support 74. Sprocket 300 comprises a sprocket body 304 having side surface 308 and 310 and an inner peripheral surface 312 defining a sprocket mounting opening 316, wherein at least one portion of the inner peripheral surface 312 is adapted to contact sprocket support 74. In this embodiment, the entire inner peripheral surface 312 contacts the sprocket support 74. Sprocket 300 further comprises a plurality of sprocket teeth 320 extending radially outwardly from the sprocket body 304, wherein the lower portion of sprocket body 304 is axially offset from the plurality of sprocket teeth 320 (to the left in FIG. 4(b)).

Inner peripheral surface 312 of sprocket 300 also defines at least one radially inwardly extending spline 336 and one radially outwardly extending spline 340. In this embodiment, there is a plurality of such radially inwardly extending splines 336 and radially outwardly extending splines 340. Each radially inwardly extending spline 336 has a radially inner surface 338, and each radially outwardly extending spline has a radially outer surface 342. In this embodiment, there are nine radially inwardly extending splines 336 and nine radially outwardly extending splines 340, wherein each radially inwardly extending spline 336 alternates with a corresponding radially outwardly extending spline 340.

In this embodiment, the circumferential width WRIS300 of each of the plurality of radially inwardly extending splines 336 is the same except for a circumferential width WPIS300 of a radially inwardly extending positioning spline 336a. Also, the circumferential width WROS300 of each of the plurality of radially outwardly extending splines 340 is the same except for a circumferential width WPOS300 of a radially outwardly extending positioning spline 340a.

In this embodiment, the distance RISD300 of the radially inner surface 338 of each of the plurality of radially inwardly extending splines 336 from the center C of sprocket 300 is the same, and the distance ROSD300 of the radially outer surface 342 of each of the plurality of radially outwardly extending splines 340 from the center C of sprocket 300 is the same. Furthermore, the distances RISD200 of sprocket 200 and RISD300 of sprocket 300 are the same. Since the distances RID1 and RID2 of sprocket support 74 are the same, and assuming that the distances RID1, RID2, RISD200 and RISD300 are the same, then the radially inwardly extending splines 110 and 126 of first outer peripheral surface portion 90 and second outer peripheral surface portion 94 of sprocket support 74, respectively, can accommodate the radially inwardly extending splines 236 and 336 of both sprockets 200 and 300, respectively. However, as noted below, in his embodiment sprocket 200 will not be mounted to the second outer peripheral surface portion 94 of sprocket support 74.

As noted previously, the distance ROSD200 of the radially outer surface 242 of each of the plurality of radially outwardly extending splines 240 from the center C of sprocket 200 is the same, and the distance ROSD300 of the radially outer surface 342 of each of the plurality of radially outwardly extending splines 340 from the center C of the sprocket 300 is the same. It can be assumed that the distance ROSD200 of the radially outer surface 242 of each of the plurality of radially outwardly extending splines 240 from the center C of sprocket 200 is substantially equal to the distance ROD1 of the radially outer surface 122 of each of the plurality of radially outwardly extending splines 114 from the center C of sprocket support 74, and that the distance ROSD300 of the radially outer surface 342 of each of the plurality of radially outwardly extending splines 340 from the center C of sprocket 300 is substantially equal to the distance ROD2 of the radially outer surface 138 of each of the plurality of radially outwardly extending splines 130 from the center C of sprocket support 74. However, the distance ROSD200 of sprocket 200 is less than the distance ROSD300 of sprocket 300, and the distance ROD1 of sprocket support 74 is less than the distance ROD2 of sprocket support 74. As a result, sprocket 300 may be mounted on either the first outer peripheral surface portion 90 or the second outer peripheral surface portion 94 of sprocket support 74, which allows for interchangeability of sprockets and/or greater flexibility of sprocket positioning. On the other hand, because of the smaller distance ROSD200 of sprocket 200 relative to the larger distance ROD2 of the second outer peripheral surface portion 94 of sprocket support 74, sprocket 200 typically will not be mounted to second outer peripheral surface portion 94 of sprocket support 74. Of course, that need not be the case in other embodiments.

In known sprocket supports, RID1=RID2, and the sprocket support is made of steel or light alloy. When the sprocket support is made of steel, then the gap ROD1-RID1 is rather small, but since the strength of the steel is strong, the mesh between the splines of the sprocket support and the splines of the sprocket remain adequate. However, if the sprocket support is made of light alloy, then the gap is too narrow and the sprocket tends to shear off the splines on the sprocket support. To overcome this problem, the gap ROD1-RID1 is made greater, and new sprockets are designed to match the new spline distances of the sprocket support. However, if RID1 is made smaller than existing sprocket supports, then the new sprockets cannot be used with existing sprocket supports, and interchangeability is destroyed. If ROD1 is made larger than existing sprocket supports, then the radial distances of the splines on the smaller sprockets must be increased accordingly, which lowers the strength of the smaller sprocket. With the sprocket support 74 disclosed herein, the first outer peripheral surface portion 90 is made with the same distances as known sprocket supports. However, rather than increase the radial distance of the small sprocket splines, the lateral projections 224 are used to strengthen the sprocket as described below.

Figure 5:
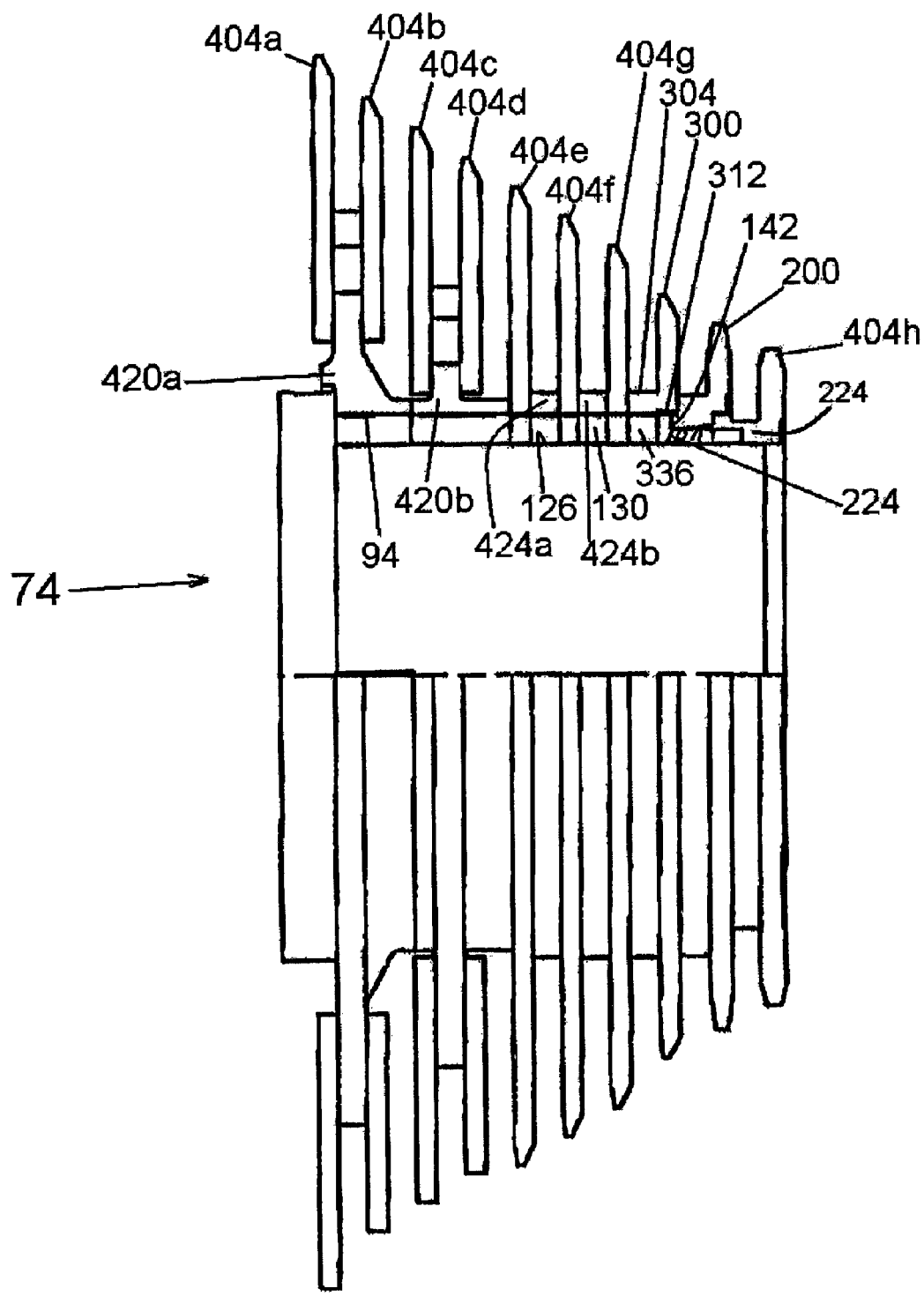
FIG. 5 is a partial cross-sectional view of an embodiment of a plurality of sprockets mounted on the sprocket support shown in FIGS. 2(a) and 2(b)

FIG. 5 is a partial cross-sectional view of an embodiment of a plurality of sprockets mounted on the sprocket support 74. In this embodiment, sprockets 404a and 404b having a varying number of teeth are mounted to the second outer peripheral surface portion 94 of sprocket support 74 through a sprocket adapter 420a, and sprockets 404c and 404d having a varying number of teeth are mounted to the second outer peripheral surface portion 94 of sprocket support 74 through a sprocket adapter 420b. Sprocket adapters 420a and 420b have radially inwardly extending splines and radially outwardly extending splines (including positioning splines, not shown) in the same manner as the radially inwardly extending splines 336, 336a and radially outwardly extending splines 340, 340a of sprocket 300. Another plurality of sprockets 404e, 404f and 404g having a varying number of teeth are directly mounted to the second outer peripheral surface portion 94 of sprocket support 74. The inner peripheral surface of sprockets 404e, 404f and 404g have radially inwardly extending splines and radially outwardly extending splines (including positioning splines, not shown) in the same manner as the radially inwardly extending splines 336, 336a and radially outwardly extending splines 340, 340a of sprocket 300. Sprockets 404e and 404f are axially separated from each other by a spacer 424a, and sprockets 404f and 404g are axially separated from each other by a spacer 424b.

In this embodiment, sprocket 300 is mounted on the second radially outer peripheral surface 94 of sprocket support 74, and the lower portion of sprocket body 304 of sprocket 300 abuts against the right side surface of sprocket 404g and functions as a spacer. Such a configuration also allows the radially inwardly extending splines 336 and 336a of sprocket 300 to have a greater axial thickness. The radially inwardly extending splines 336 of sprocket 300 completely engage the radially inwardly extending splines 126 of the second outer peripheral surface portion 94 of sprocket support 74 (i.e., the radially inner surfaces 338 of radially inwardly extending splines 336 almost or in fact contact the corresponding radially inner surfaces 134 of radially inwardly extending splines 126 of sprocket support 74). Furthermore, the radially inwardly extending positioning spline 336a of sprocket 300 completely engages the radially inwardly extending positioning spline 126a of sprocket support 74. Similarly, the radially outwardly extending splines 340 of sprocket 300 completely engage the radially outwardly extending splines 130 of the second outer peripheral surface portion 94 of sprocket support 74, and the radially outwardly extending spline 340a of sprocket 300 completely engages the radially outwardly extending spline 130a of sprocket support 74.

As shown in FIG. 5, sprocket 200 is mounted on the first radially outer peripheral surface 90 of sprocket support 74. In this configuration, the radially inwardly extending splines 236, 236a of sprocket 200 completely engage the respective radially inwardly extending splines 110, 110a of the first outer peripheral surface portion 90 of sprocket support 74, and the radially outwardly extending splines 240, 240a of sprocket 200 completely engage the respective radially outwardly extending splines 114, 114a of the first outer peripheral surface portion 90 of sprocket support 74. The lower portion of sprocket body 204 abuts against transition surface 142. Because the radially inwardly extending splines 336 of sprocket 300 are laterally offset from the plurality of sprocket teeth 320, the radially outer surfaces 232 of lateral projections 224 of sprocket 200 may extend under and contact the inner peripheral surface 312 of sprocket 300. This provides further support and stabilization for sprocket 300.

The shaded portion at sprocket 200 represents the engagement between the radially inwardly extending splines 110 of sprocket support 74 and the corresponding radially inwardly extending splines 236 of sprocket 200. The clear portion to the right of the shaded portion indicates the engagement between the radially outwardly extending splines 114 of sprocket support 74 and the corresponding radially outwardly extending splines 240 of sprocket 200. Because of the different circumferential widths 224a, 236a and 240a of the splines on sprocket 200 and the different circumferential widths 110a and 114a of the splines on sprocket support 74, sprocket 200 can be mounted on first outer peripheral surface portion 90 of sprocket support 74 in a predetermined rotational direction. This is very helpful when the various sprockets mounted on sprocket support 74 must have a predetermined rotational position relative to each other, such as when there are chain shift facilitating structures on the various sprockets. Another sprocket 404h (e.g., an eleven tooth sprocket) is attached to the laterally outermost end of sprocket support 74 using a convenient means such as an annular nut (not shown) that screws onto the threaded portion 92 of sprocket support 74.

Figure 6A:
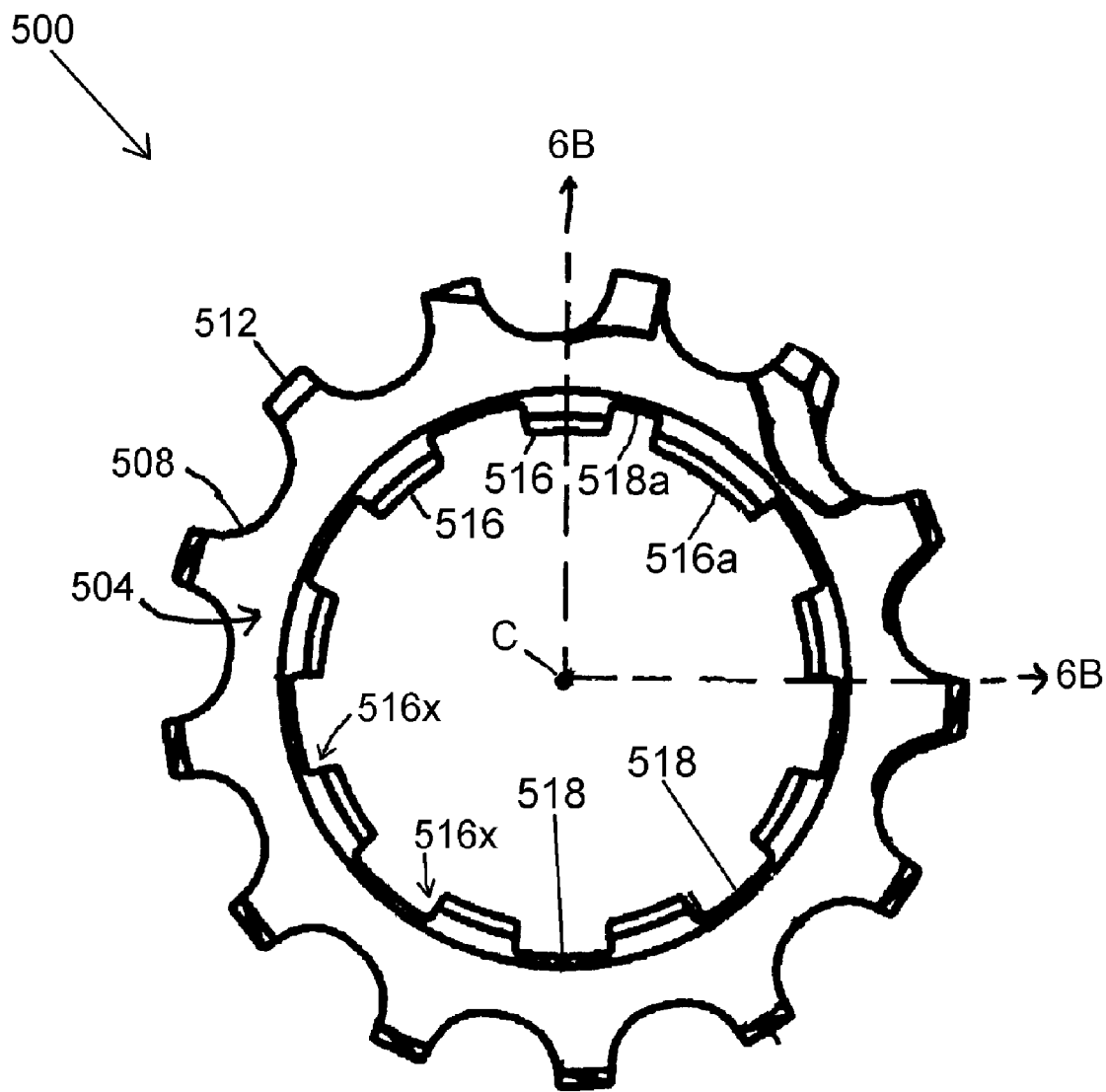
FIG. 6(a) is a front view of another embodiment of a thirteen-tooth sprocket.
Figure 6B:
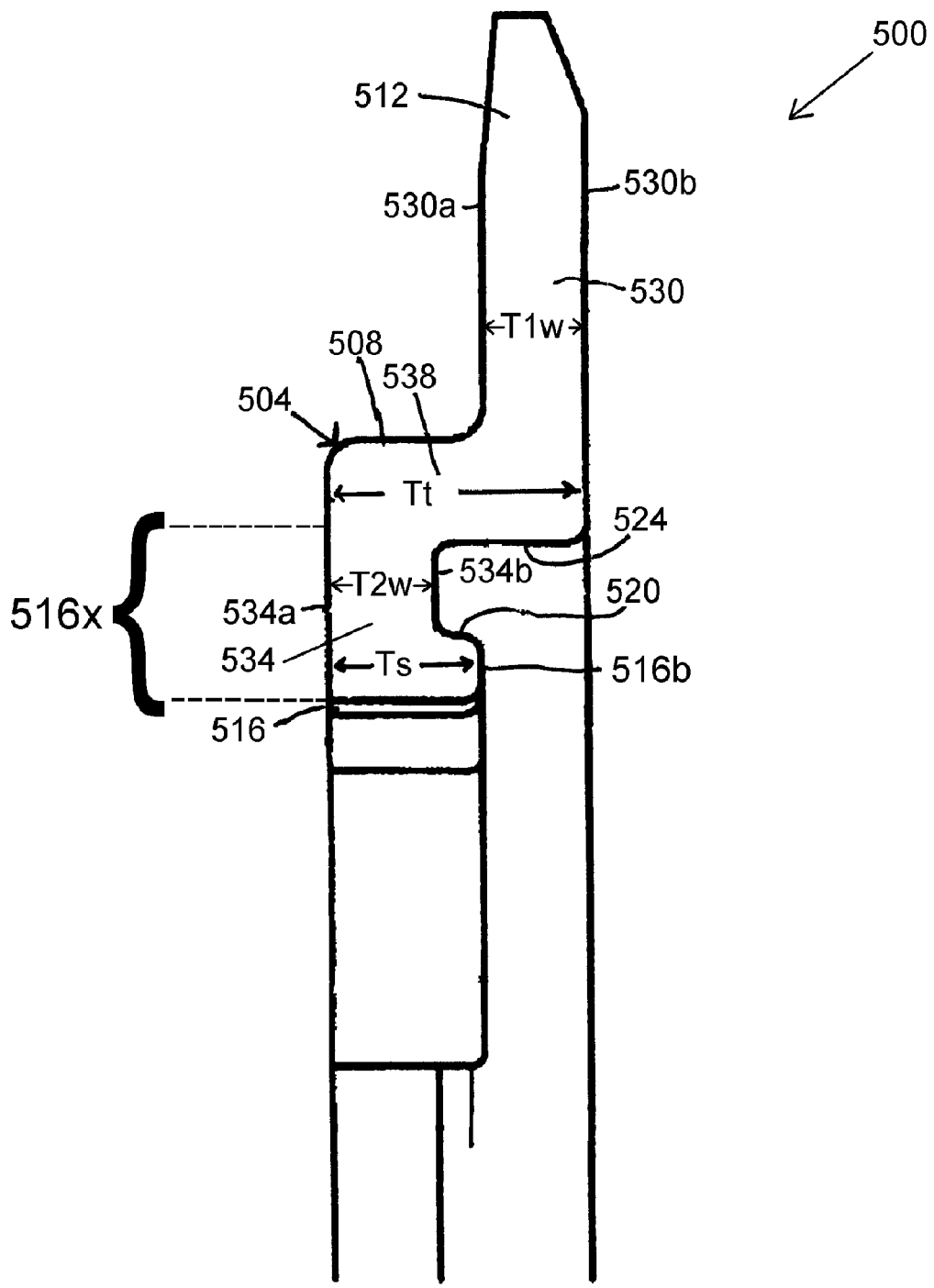
FIG. 6(b) is a view taken along line 6B-6B in FIG. 6(a).

FIG. 6(a) is a front view of another embodiment of a thirteen-tooth sprocket 500, and FIG. 6(b) is a detailed cross-sectional view of the radially inwardly extending spline configuration for sprocket 500. Sprocket 500 is particularly useful when it is to be mounted on the first outer peripheral surface portion 90 of sprocket support 74. Since the radially outer surfaces 122 of the plurality of radially outwardly extending splines 114 of sprocket support 74 have reduced radially outer distances ROD1 compared to the radially outer distances ROD2 of the radially outer surfaces 138 of the plurality of radially outwardly extending splines 130, the plurality of radially outwardly extending splines 114 are not as strong as the plurality of radially outwardly extending splines 130. As a result, if the plurality of radially inwardly extending splines 336 on the thirteen-tooth sprocket 300 are too thin in the direction of rotational axis C, then the radially inwardly extending splines 336 may damage the plurality of radially outwardly extending splines 114 of sprocket support 74 as a result of the rotational force communicated from the bicycle chain.

Sprocket 500 minimizes or eliminates the risk of damage to sprocket support 74, even when it is mounted on first outer peripheral surface portion 90 of sprocket support 74. This is accomplished generally by providing radially inwardly extending splines that are relatively thick in the direction of rotational axis C. More specifically, sprocket 500 comprises a sprocket body 504 having a side wall 508, a plurality of teeth 512 extending radially outwardly from sprocket body 504 and dimensioned to engage a bicycle chain, a plurality of radially inwardly extending splines (projections) 516 and a plurality of outwardly extending splines (slots) 518. In this embodiment, sprocket body 504, the plurality of teeth 512, the plurality of radially inwardly extending splines 516 and the plurality of outwardly extending splines 518 are one piece. As with the other embodiments, sprocket 500 includes a radially inwardly extending spline 516a that has a circumferential width different from the other radially inwardly extending splines 516, as well as a radially outwardly extending spline 518a that has a circumferential width different from the other radially outwardly extending splines 518.

Sprocket 500 includes a plurality of radially outer surfaces 520, one associated with each radially inwardly extending spline 516, that at least partially overlaps its corresponding radially inwardly extending spline 516 when viewed in a direction perpendicular to rotational axis C. Also, each radially outer surface 520 faces a radially inner surface 524 of sprocket body 504 that is substantially straight and parallel to rotational axis C. Since, in this embodiment, each outer surface 520 is associated with a corresponding radially inwardly extending spline 516, each outer surface 520 extends only partially in a circumferential direction of sprocket 500, and more particularly, each outer surface 520 has the same circumferential width as spline 516. Side wall 508 overlaps the plurality of outer surfaces 520 when viewed in a direction parallel to rotational axis C.

In this embodiment, side wall 508 includes a first side wall portion 530 and a second side wall portion 534 connected together through a transition wall portion 538. As a result, second side wall portion 534 is laterally offset from first side wall portion 530 so that second side wall portion 534 is spaced apart from first side wall portion 530 in the direction of rotational axis C. Also, it is second side wall portion 534 that overlaps the plurality of outer surfaces 520 when viewed in a direction parallel to rotational axis C. First side wall portion 530 has substantially straight and parallel first side walls 530a and 530b, and second side wall portion 534 has substantially straight and parallel second side walls 534a and 534b.

In this embodiment, second side wall portion 534 is divided into a plurality of segments, each associated with a corresponding radially inwardly extending spline 516. Thus, as with outer surfaces 520, each segmented second side wall portion 534 extends only partially in a circumferential direction of sprocket 500, and more particularly, each segmented second side wall portion 534 has a substantially same circumferential width as spline 516. Each segmented second side wall portion 534 and its associated radially inwardly extending spline 516 thus form a composite spline 516x, wherein second side wall portion 534 forms a root portion of composite spline 516x, and spline 516 forms a radially inner portion of composite spline 516x. Composite spline 516x engages the radially outwardly extending spline 130 of second outer peripheral surface portion 94 of sprocket support 74 when sprocket 500 is mounted on second outer peripheral surface portion 94.

In this embodiment, the plurality of radially inwardly extending splines 516 are offset from first side wall portion 530 in the direction of rotational axis C. For example, each radially inwardly extending spline 516 extends from second side wall 534b and terminates at a free end 516b, wherein free end 516b is spaced apart from first side wall 530b in the direction of rotational axis C. This is made possible while maintaining a reasonable axial thickness of each radially inwardly extending spline 516 and having the outer surface 520 face a corresponding inner surface 524 by making a thickness Tt of transition wall portion 538 greater than a thickness Ts of radially inwardly extending spline 516 in the direction of rotational axis C. Also, thickness Ts is greater than a thickness T1w of first wall portion 530 and a thickness T2w of second wall portion 534, wherein T1w equals T2w in this embodiment. Thus, thickness Ts is greater than a thickness T2w of the root portion of composite spline 516x in a direction of rotational axis C. In one preferable example, thicknesses Ts, T1w and T2w are 1.6 mm, 1.6 mm and 2.3 mm, respectively.

While the above is a description of various embodiments that include various inventive features, further modifications may be employed without departing from the spirit and scope of the present invention. For example, the inventive features noted should not be limited to the twelve- and thirteen-tooth sprockets described. The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle sprocket adapted to rotate around a rotational axis, wherein the sprocket comprises:
   a sprocket body having a first side wall surface that faces in a direction along the rotational axis, a second side wall surface that faces in an opposite direction along the rotational axis, and a radially inner surface that faces radially inwardly and is disposed between the first side wall surface and the second side wall surface when viewed perpendicular to the rotational axis;
   a plurality of teeth extending radially outwardly from the sprocket body and dimensioned to engage a bicycle chain;
   a radially inwardly extending spline in the form of a projection disposed between the first side wall surface of the sprocket body and the second side wall surface of the sprocket body when viewed perpendicular to the rotational axis;
   a radially outwardly extending spline in the form of a slot disposed between the first side wall surface of the sprocket body and the second side wall surface of the sprocket body when viewed perpendicular to the rotational axis;

wherein the radially outwardly extending spline is disposed circumferentially adjacent to the radially inwardly extending spline;

wherein the radially inwardly extending spline has a free end portion that extends in the direction of the rotational axis and is disposed between the first side wall surface of the sprocket body and the second side wall surface of the sprocket body when viewed perpendicular to the rotational axis;

wherein a radially outer surface is formed on the free end portion of the radially inwardly extending spline;

wherein the radially outer surface is disposed between the first side wall surface of the sprocket body and the second side wall surface of the sprocket body when viewed perpendicular to the rotational axis;

wherein the radially outer surface is discontinuous in the circumferential direction; and wherein the radially outer surface formed on the free end portion of the radially inwardly extending spline faces radially outwardly and faces the radially inner surface of the sprocket body.

2. The sprocket according to claim 1 wherein the radially inner surface of the sprocket body is substantially straight in a direction of the rotational axis.

3. The sprocket according to claim 1 wherein the radially inner surface of the sprocket body is substantially parallel to the rotational axis.

4. The sprocket according to claim 1 wherein the sprocket body includes a first side wall portion and a second side wall portion, wherein the plurality of teeth extend radially outwardly from the first side wall portion, and wherein the second side wall portion is laterally offset from the first side wall portion.

5. The sprocket according to claim 4 wherein the second side wall portion overlaps the radially outer surface formed on the free end portion of the radially inwardly extending spline when viewed in a direction parallel to the rotational axis.

6. The sprocket according to claim 5 wherein the second side wall portion is offset from the first side wall portion in a direction of the rotational axis.

7. The sprocket according to claim 5 wherein the radially inwardly extending spline is offset from the first side wall portion in a direction of the rotational axis.

8. The sprocket according to claim 4 wherein the radially inwardly extending spline extends from the second side wall portion, and wherein the free end portion of the radially inwardly extending spline is offset from the first side wall surface in a direction of the rotational axis.

9. The sprocket according to claim 1 wherein the sprocket body has a side wall that includes a first side wall portion and a second side wall portion, wherein the plurality of teeth extend radially outwardly from the first side wall portion, and wherein the second side wall portion and the radially inwardly extending spline together form a composite spline.

10. The sprocket according to claim 9 wherein a thickness of the radially inwardly extending spline in a direction of the rotational axis is greater than a thickness of the second side wall portion in a direction of the rotational axis.

11. The sprocket according to claim 10 wherein a thickness of the first side wall portion in a direction of the rotational axis substantially equals a thickness of the second side wall portion in the direction of the rotational axis.

12. The sprocket according to claim 1 wherein the plurality of teeth are formed as one-piece with and extend radially outwardly from the sprocket body.

13. The sprocket according to claim 1 wherein the radially outer surface terminates circumferentially at the radially outwardly extending spline.

14. The sprocket according to claim 1 wherein the entire root portion of the spline terminates circumferentially at the radially outwardly extending spline.

15. A bicycle sprocket adapted to rotate around a rotational axis, wherein the sprocket comprises:
a sprocket body;
a plurality of teeth extending radially outwardly from the sprocket body and dimensioned to engage a bicycle chain;
a radially inwardly extending spline in the form of a projection extending radially inwardly from the sprocket body, wherein the radially inwardly extending spline has a root portion and a radially inner portion, wherein the root portion extends radially inwardly of the sprocket body and has a side wall facing in a direction of operating rotation of the sprocket body, and wherein the radially inner portion extends radially inwardly of the root portion and has a side wall facing in the direction of operating rotation of the sprocket body;
wherein the root portion of the radially inwardly extending spline originates from and extends radially inwardly from an innermost peripheral surface of the sprocket body that forms an a circumferentially adjacent radially outwardly extending spline in the form of a slot, wherein the radially inwardly extending spline terminates in a radially inwardly facing free end;
wherein a thickness of the radially inner portion of the radially inwardly extending spline in a direction parallel to the rotational axis is greater than a thickness of the root portion of the radially inwardly extending spline in a direction parallel to the rotational axis; and
wherein the radially inner portion has a radially outer surface facing a radially inner surface of the sprocket body.

16. The sprocket according to claim 15 wherein the sprocket body has a side wall that includes a first side wall portion, wherein the plurality of teeth extend radially outwardly from the first side wall portion, wherein a thickness of the first side wall portion in a direction parallel to the rotational axis substantially equals a thickness of the root portion of the radially inwardly extending spline in a direction parallel to the rotational axis.

17. The sprocket according to claim 15 wherein the plurality of teeth are formed as one-piece with and extend radially outwardly from the sprocket body.

* * * * *